June 21, 1966 U. C. McMILLER 3,257,052
CAR TOP CARRIER DEVICE
Filed Jan. 15, 1964
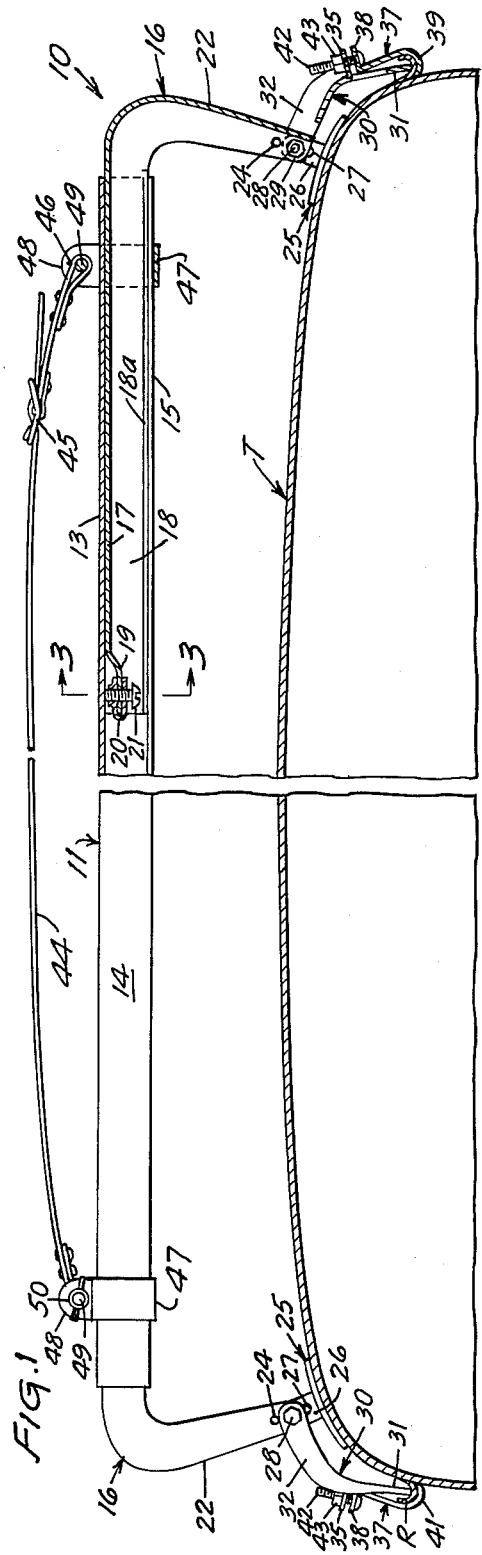
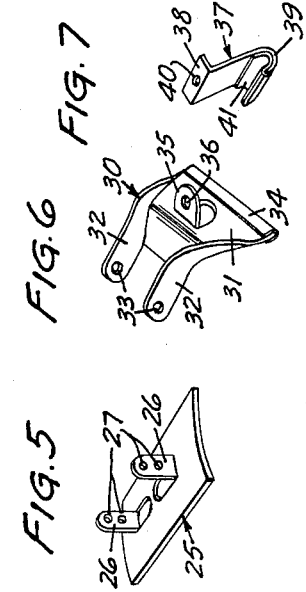
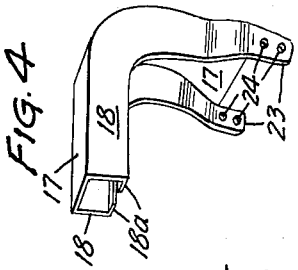
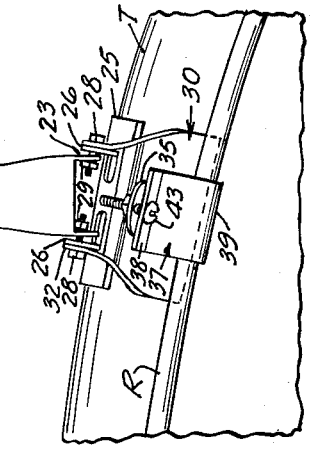
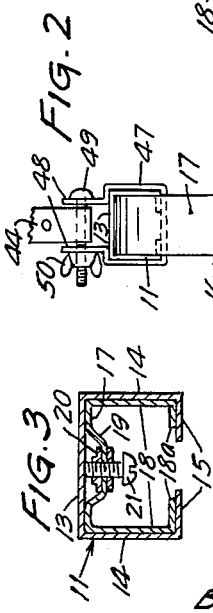
INVENTOR
URBAN C. McMILLER
BY Williamson Palmatier
ATTORNEYS

United States Patent Office 3,257,052
Patented June 21, 1966

3,257,052
CAR TOP CARRIER DEVICE
Urban C. McMiller, Minneapolis, Minn., assignor to Karpak Company, Minneapolis, Minn., a corporation of Minnesota
Filed Jan. 15, 1964, Ser. No. 337,829
6 Claims. (Cl. 224—42.1)

This invention relates to car top carrier devices attachable to the automobile tops for use in supporting objects thereon such as skis, luggage and the like.

An object of this invention is to provide a car top carrier device including a pair of car top carrier units each being longitudinally adjustable for accommodating cars of varying widths and each unit having means at opposite ends thereof which seat upon the car adjacent the longitudinal margins thereof and which fit variously contoured car tops, and each unit having means for positively but reelasably engaging the rain gutters whereby the carrier device is especially adaptable for use in supporting objects thereon such as luggage, skis and the like.

Another object of this invention is to provide a car top carrier device comprised of a central bar member having a pair of end bar members telescopically engaging the same, each being pivotally engageable with a car top engaging plate having rain gutter engaging means for releasably enaging the rain gutters of the car top and which are independently adjustable with respect to the longitudinal adjustment of the bar structure thereby permitting ready mounting of the carrier device upon the top of a car with a minimum of effort and requiring a minimum amount of adjustment.

A further object of this invention is to provide a car top carrier device of the class described wherein the connection between the end bar member and the top engaging plate is angularly adjustable to thereby accommodate rain gutters, which vary in longitudinal pitch while allowing mounting of the carrier bars in transversely extending relation to the car top.

These and other objects and advantages of the invention will more fully appear from the following description made in connection with the accompanying drawings, wherein like character references refer to the same or similar parts throughout the several views, and in which:

FIG. 1 is a cross sectional view of a conventional automobile top showing the carrier device installed thereon and with parts thereof broken away for clarity;

FIG. 2 is a fragmentary end elevational view on an enlarged scale of the car top carrier device illustrating in detail the particular manner in which the carrier device is clamped to the rain gutter;

FIG. 3 is a cross sectional view on an enlarged scale taken approximately along line 3—3 of FIG. 1 and looking in the direction of the arrows;

FIG. 4 is a fragmentary perspective view of one terminal portion of an end bar member;

FIG. 5 is a perspective view of a car top engaging plate;

FIG. 6 is a perspective view of a rain gutter engaging member; and

FIG. 7 is a perspective view of the gutter engaging clamp.

The car top carrier device constituting the instant invention is actually comprised of a pair of car top carrier units, one embodiment of which is illustrated in FIG. 1 and designated generally by the reference numeral 10. The pair of car top carrier units 10 are mounted transversely of the top of an automobile in longitudinally spaced-apart relation with respect to each other and serve to support thereon various objects such as luggage, skis and the like. It will be seen that the car top carrier unit 10 is comprised of an elongate bar structure 11 which, as seen, has the major portion thereof spaced above the car top T to which it is mounted and has means at opposite ends thereof for clamping the same to the car top.

This bar structure 11 includes an elongate central bar member 12 which, as best seen in FIG. 3, is of channel-shaped cross sectional configuration including a web portion 13 having flange portions 14 integrally formed therewith, the terminal portions of which have inturned flanges 15 affixed thereto. This contral bar member is preferably constructed of a suitable metallic material and is of sufficient strength through its channel construction to support substantially heavy loads.

The bar structure 11 also includes a pair of substantially identical end bar members 16, each of which are telescopically received in one end of the central bar member 12. Each of these end bar members 16, as best seen in FIG. 1, is substantially straight throughout the major length thereof and is of substantially channel-shaped configuration including a web portion 17, depending flange portions 18 and inturned flanges 18a. It will also be noted since the elongate straight portion of each of the end bar members 16 is of substantially similar but smaller cross sectional configuration with respect to the central bar member 12, each of these end bar members fit with snug fitting relation within the central bar member and are longitudinally adjustable relative thereto.

Means are also provided for locking each end bar member in longitudinally adjusted relation with respect to the central bar member and to this end it will be seen that the web portion 17 of each end bar member adjacent the inner end thereof is offset as at 19 to accommodate a set screw locking unit. It will also be noted that this set screw locking unit comprises a generally U-shaped element 20 which is clamped or otherwise secured to the centrally and downwardly offset terminal portion 19, as best seen in FIG. 1. The legs of the U-shaped element 20 are provided with apertures which are disposed in registering relation with an aperture in the offset portion 19 of the web portions 17 and the aperture in one of the legs of the U-shaped element 20 is threaded to threadedly engage a locking set screw 21. It will therefore be seen that by tightening the set screw 21 of each end bar member 16, the end bar member can be locked in longitudinally adjusted relation with respect to the central bar member 12.

The outer end of each of the end bar members 16 is bent to define a downwardly projecting leg portion 22, the included angle between the leg portion and the major portion of each end bar member being less than ninety degrees. Referring now to FIGS. 2 and 4 it will be seen that the web portion 17 of each leg portion 22 increases in width and that this leg portion has no inturned flanges 18a. The flange portions 18 of the leg portion 22, as best seen in FIG. 4, project downwardly beyond the web portion 17 thereof to define a pair of spaced-apart attachment ears 23 each having a pair of vertically spaced-apart apertures 24 therein. It is pointed out that the uppermost of the apertures of one attachment ear 23 is disposed in substantial alignment with the uppermost aperture in the other of the attachment ears and that the respective lower apertures therein are also disposed in alignment with each other.

Means are also provided for supporting the lowermost ends of each of the end bar members 16 upon a car top T adjacent but spaced inwardly from the conventional longitudinally extending rain gutters R of the car top. This means includes a pair of substantially identical car top engaging plates 25 and these plates are preferably constructed of a suitable rigid metallic material but are preferably covered with a coating of plastic or the like to preclude any tendency of these plates from marring or otherwise scratching the exterior surface of the car top T. It will be seen that each plate is of generally rectangular configuration and while being generally flat, is slightly arcuate in a transverse direction.

It will also be noted that each plate 25 has a pair of upwardly struck ears 23 located in the longitudinal central vertical line plane thereof, the transverse spacing between ears being slightly greater than the spacing between the attachment ears 23 of each of the end bar members 12. Each attachment ear 26 has a pair of vertically spaced-apart apertures 27 therein, and the uppermost apertures of the ears are disposed in longitudinal alignment while the lowermost apertures of these ears are also disposed in transverse alignment. Thus when the apertures 27 and the ears 26 are disposed in registering relation with apertures 24 and the attachment ears 23 of the end bar members 16, each of the end bar members may be pivotally connected to one of the car top engaging plates 25 by suitable pivot bolts 28, each of which is provided with a retaining nut 29, as best seen in FIG. 2. Thus with this pivotal arrangement between the end bar members 16 and the car top engaging plates 25 car tops of varying transverse contour may be readily accommodated.

To this end, it is also pointed out that since the plates are only slightly arcuate in a transverse direction and since these car top engaging plates 25 have a relatively small transverse or width dimension with respect to the car top, the plates may be mounted adjacent the rain gutters of automobile car tops regardless of whether these marginal portions of the car top extend gradually downwardly or present an abrupt downward contour. The longitudinal adjustment between the end bar members and central bar members also facilitate mounting of the car top carrier unit upon the tops of automobiles.

Means are also provided for clamping each car top carrier unit 10 to the rain gutters R of the car top and for also positioning the car top engaging plates 25 in inwardly spaced relation with respect to the rain gutters. This means includes a pair of rain gutter engaging members 30 which are of substantially identical construction and each preferably being formed of a suitable rigid metallic material. Referring now to FIGS, 1, 2 and 6 it will be seen that each of the rain gutter engaging members 30 includes an arcuate central or web portion 31 having upturned marginal flanges which project beyond one edge of the web portion 31 to define vertically oriented attachment ears 32.

Referring again to FIG. 2 it will be seen that the spacing between the attachment ears 32 is slightly greater than the spacing between the attachment ears 26 of the associated car top engaging plate 25. It will also be noted that each of these attachment ears 32 is provided with a suitable aperture 33 therein, the apertures 33 being in substantially transverse alignment with respect to each other. These apertured ears 32 also accommodate the pivot bolts 28 whereby the pivotal axes between each end bar member, the associated car top mounting plate and each rain gutter engaging member is substantially coaxial.

In the embodiment shown, the central or web portion 31 of each rain gutter engaging member 30 increases in width from its normally oriented upper edge to the lower edge thereof. This lower edge, as shown, is substantially straight and is provided with an edge covering element which may be formed of a suitable plastic material so that this lowermost edge will not mar or damage the paint surface of the rain gutter R. Referring again to FIGS. 1, 2 and 6 it will be seen that each rain gutter engaging member 30 has an attachment ear 35 struck upwardly from the central or web portion 31, this attachment ear having an aperture 36 therethrough.

When a car top carrier unit 10 is mounted upon the top T of an automobile, it will be seen that each of the rain gutter engaging members 30 will have the lowermost edge thereof positioned in engaging relation with the longitudinally extending rain gutter R of the automobile top while the other end thereof will be pivotally connected by means of the pivot bolts 28 to the attachment ears 26 of the associated car top engaging plate 25. It will be noted, as best seen in FIG. 1, that the rain gutter engaging members 30 are spaced above the car top and serve to position the plates 25 inwardly from the rain gutters and to prevent downward or outward sliding movement thereof.

Means are therefore provided for clamping the rain gutter engaging members 30 in releasably clamped relation with respect to the rain gutters and this means includes a rain gutter engaging clamp 37 which is constructed from substantially flat metal stock and has one end thereof bent upwardly to define an attachment tab 38 and has the other end thereof arcuately bent downwardly to define a hook portion 39, as best seen in FIG. 7. The attachment tab 38 is provided with a suitable aperture 40 therethrough while the concave surface and edge of the hook portion 39 is provided with a covering element 41 preferably formed of substantially the identical material such as plastic of which the edge covering element 34 is formed. It will be noted, as best seen in FIG. 1, that this covering element 41 will allow the hook portion to engage the lower or under surface of the rain gutter R without damaging the exterior surface of the rain gutter even when the engaging clamp 37 is urged into tightly clamped relation with respect to the rain gutter.

A suitable bolt 42 extends through the aperture 40 of the rain gutter engaging clamp and through the aperture 36 of the attachment ear 35 of the associated rain gutter engaging member 30. A retaining nut 43 is provided to permit retention of the bolt in interconnecting relation with respect to the clamp and engaging member and also permitting relative adjustment therebetween.

Means are also provided for securing articles in mounted relation upon the bar structure 11 and in the embodiment illustrated this means includes a pair of elongate flexible straps 44 of conventional construction having conventional buckle connection means 45 at their respective innermost ends and each having an attachment loop 46 at its other end. A pair of generally U-shaped bar engaging clamps 47 engage the central bar member 12 in sliding relation thereon with the web or bight portions of these clamps disposed lowermost. The legs of the clamps 47 are inwardly offset adjacent their uppermost ends to define attachment ears 48 which are suitably apertured to permit the passage of a clamping bolt 49 therethrough. A wing nut 50 threadedly engages the clamping bolt 49 and cooperates therewith for clamping the associated bar engaging clamp 47 in clamped relation with respect to the central bar member 12. It will be noted, as best seen in FIG. 2, that the clamping bolt 49 extends through the attachment loop 46 of the associated flexible strap 44 and serve to anchor the same with respect to the bar structure 11.

In use, a pair of the car top carrier units 10 will be positioned in longitudinally spaced-apart transversely extending relation upon the car top so that the car top engaging plates 25 seat upon the top of the car adjacent the rain gutters thereof as best seen in FIG. 1. The end bar members 16 will have been longitudinally adjusted relative to the central bar member 12 to accommodate and permit proper mounting of the carrier unit with respect to the width dimension of the car top. Each of the rain gutter engaging members will be positioned whereby the lower covered edge thereof engages the upper surface of the rain gutter and the hook portion 39 of each rain gutter engaging clamp 37 will be looped around the lower or under surface of the rain gutter. Thereafter upon adjusting the bolt 42, each rain gutter engaging member and associated clamp 37 will be urged into clamping relation with respect to the car top rain gutter. Articles may then be mounted upon the bar structures of each carrier unit and the flexible straps are clamped therearound.

It will be seen from FIG. 1 that the pivot bolts 28 pass through the lowermost apertures 24 in the attachment ears 23 of the end bar members 16 and also pass through the uppermost apertures in the attachment ears 26 of the car top engaging plates 25. The bolts, of course, pass through the apertures 33 in the rain gutter engaging member 30. With this arrangement, the axis of pivot at each end between each end bar member, the associated car top engaging plate and the rain gutter engaging member is disposed substantially longitudinally of the car top and substantially parallel with the ground and the car top engaging plate 25. This particular interconnection of the various components at each end of each carrier unit is desirable if the rain gutter engaging member engages a horizontal portion of the rain gutter. However, in some instances it is necessary to so space the carrier units apart so that the units must be clamped against a downwardly inclined portion of the rain gutter.

Referring now to FIG. 2, it will be seen that the end bar members, the associated car top engaging plate and the rain gutter engaging member may be so interconnected that even when clamped against a downwardly inclined end portion of a rain gutter the bar structure will present a substantially flat horizontal upper surface. This is accomplished by inclining the pivot axis between the end bar members and the car top engaging plates 25. Thus it will be seen that one of the pivot bolts 28 will project through the uppermost aperture 24 of one attachment ear 23 for an end bar member 16 while the other bolt thereof will project through the lowermost aperture 24 in the other attachment ear 23. These pivot bolts for each car top engaging plate also project through the uppermost pair of apertures 27 therein although it is pointed out that the amount of inclination of the pivotal axis may be varied through the use of different apertures in the car top engaging plate 25.

To remove the carrier unit from mounted relation upon an automobile car top it is merely necessary to loosen the clamping bolts 42 whereby the engaging clamps 37 may be disengaged from the rain gutter. It will therefore be seen that the entire assembly may be quickly mounted, adjusted and/or removed from the car top with a minimum of time and with a minimum of effort.

From the foregoing description it will be seen that I have provided a novel car top carrier device which may be readily mounted upon most conventional car tops even though such car tops vary in length, width and cross sectional contour.

It will be noted from the preceding paragraphs that each carrier unit is releasably clamped to the rain gutter of such car tops and is so arranged and constructed that the pivot axis between the bar structure may be disposed horizontally or inclined thereby permitting attachment of the carrier unit in clamped relation with downwardly inclined rain gutters while still allowing the carrier bar structure to be maintained in substantially horizontal relation. This particular arrangement allows the car top carrier to be used with compact automobiles even though the longitudinal dimension of the car tops of such automobiles is substantially smaller than a corresponding longitudinal dimension of conventional sized automobiles.

It will therefore be seen that I have provided a car top carrier device which is not only of simple and inexpensive construction but one which functions in a more efficient manner than any heretofore known comparable devices.

It will, of course, be understood that various changes may be made in the form, details, arrangement and proportions of the various parts without departing from the scope of my invention.

What is claimed is:

1. A car top carrier device for use with car tops of the type having longitudinally extending rain gutters, said device comprising
    an elongate, longitudinally adjustable bar structure extending transversely of the car top and having opposite ends thereof bent downwardly towards the car top,
    a pair of similar car top engaging plate members each being engageable with the car top adjacent one of the rain gutters thereof,
    means pivotally connecting each plate member with one end portion of said bar structure to permit relative pivoting movement therebetween about an axis extending longitudinally of the car top,
    a pair of gutter engaging members each having an edge thereof for engagement of the upper surface of one of the rain gutters,
    means pivotally connecting each gutter engaging member with one of said plates for pivotal movement therebetween about an axis extending longitudinally of the car top,
    and a pair of gutter engaging clamp elements each being engageable with the underside of one of the rain gutters of the car top and each being adjustably connected to one of said gutter engaging members for clamping the same to the rain gutter.

2. The car top carrier device as defined in claim 1 wherein each pivotal axis between each end portion of said bar structure and a plate member is substantially coaxial with the axis of pivot of the associated gutter engaging member.

3. The car top carrier device as defined in claim 1 wherein the pivotal connection between each end portion of said bar structure and a plate member is adjustable between a first position wherein the axis of pivot therebetween is substantially parallel to the general plane of the plate member, and a second position wherein the axis of pivot is inclined with respect to the general plane of the plate member.

4. A car top carrier device for use with car tops of the type having longitudinally extending rain gutters, said device comprising
    an elongate rigid central bar member extending transversely of the car top,
    a pair of similar angularly bent end bar members each having one end thereof telescopically engaging one end of said central bar member to permit longitudinal adjustment therebetween, and the other end of each of said end bar members extending downwardly towards the car top,
    means for releasably locking each end bar member in longitudinally adjusted relation with respect to said central bar member,
    a pair of similar plate members each being engageable with the car top adjacent one of the rain gutters thereof,
    means pivotally connecting each plate member with said other end of each end bar member to permit relative pivoting movement therebetween about an axis extending longitudinally of the car top,
    a pair of similar gutter engaging members each having an edge thereof for engaging the upper surface of one of the rain gutters,
    means pivotally connecting each gutter engaging member with one of said plate members for pivotal movement therebetween about an axis extending longitudinally of the car top and substantially coaxial with the axis of pivot of the associated end bar member,
    and a pair of gutter clamping elements each being engageable with the underside of one of the rain gutters of the car top and each being adjustably connected with one of said gutter engaging members for clamping the same to the rain gutter.

5. The carrier device as defined in claim 4 wherein each of said gutter engaging members is spaced above the car top.

6. The car top carrier device as defined in claim 4 wherein the pivotal connection between each end bar member and plate member is adjustable between a first position wherein the axis of pivot therebetween is substantially parallel with the general plane of the plate member, and a second position wherein the axis of pivot is inclined with respect to the general plane of the plate member.

References Cited by the Examiner

UNITED STATES PATENTS

| | | | |
|---|---|---|---|
| 2,542,907 | 2/1951 | Dayton | 24—263.3 |
| 2,809,002 | 10/1951 | Rudolph | 211—105.3 X |
| 2,731,181 | 1/1956 | Binding. | |

FOREIGN PATENTS

| | | |
|---|---|---|
| 601,738 | 7/1960 | Canada. |
| 699,968 | 11/1953 | Great Britain. |
| 834,050 | 5/1960 | Great Britain. |
| 342,096 | 12/1959 | Switzerland. |

GERALD M. FORLENZA, *Primary Examiner.*

HUGO O. SCHULZ, *Examiner.*